United States Patent [19]

Merchel

[11] Patent Number: 5,513,507
[45] Date of Patent: May 7, 1996

[54] CARD FOR A PLEDGE LOCK

[75] Inventor: Horst Merchel, Bietigheim-Bissingen, Germany

[73] Assignee: Vendoret Holding S.A., Luxembourg-Hesperange, Luxembourg

[21] Appl. No.: 254,296

[22] Filed: Jun. 6, 1994

[30] Foreign Application Priority Data

Jun. 4, 1993 [DE] Germany .......................... 43 18 627.0
Dec. 8, 1993 [DE] Germany .......................... 43 41 793.0

[51] Int. Cl.⁶ ........................................................ G06K 5/00
[52] U.S. Cl. ............................ 70/278; 70/413; 235/382; 235/493
[58] Field of Search ............................ 70/276, 413, 278; 235/382, 382.5, 450, 493

[56] References Cited

U.S. PATENT DOCUMENTS

| | | | |
|---|---|---|---|
| 3,465,131 | 9/1969 | Eyck | 235/450 X |
| 3,508,031 | 4/1970 | Cooper, Jr. | 235/450 X |
| 3,761,683 | 9/1973 | Rogers | 235/382 X |
| 4,077,242 | 3/1978 | Sedley | 70/413 |
| 4,692,604 | 9/1987 | Billings | 235/450 X |
| 4,766,989 | 8/1988 | Maloeuvre et al. | 194/257 |
| 5,032,709 | 7/1991 | Lee et al. | 235/493 |
| 5,069,324 | 12/1991 | Lapage et al. | 194/212 |
| 5,361,871 | 11/1994 | Gupta et al. | 235/383 X |

FOREIGN PATENT DOCUMENTS

| | | | |
|---|---|---|---|
| 0545233A1 | 11/1992 | European Pat. Off. | |
| 0498465A1 | 12/1992 | European Pat. Off. | |
| 2059172 | 5/1971 | France | |
| 2583550 | 12/1986 | France | 235/382.5 |
| 3336657 | 4/1985 | Germany | 235/383 |
| 9301366 | 9/1993 | Germany | |
| 959713 | 6/1964 | United Kingdom | |
| 1209934 | 10/1970 | United Kingdom | |

Primary Examiner—Donald T. Hajec
Assistant Examiner—Steven Wigmore
Attorney, Agent, or Firm—Herbert Dubno

[57] ABSTRACT

The invention relates to a card for a pledge lock, more particularly of a shopping or luggage trolley, wherein the lock can be magnetically actuated by the card.

2 Claims, 2 Drawing Sheets

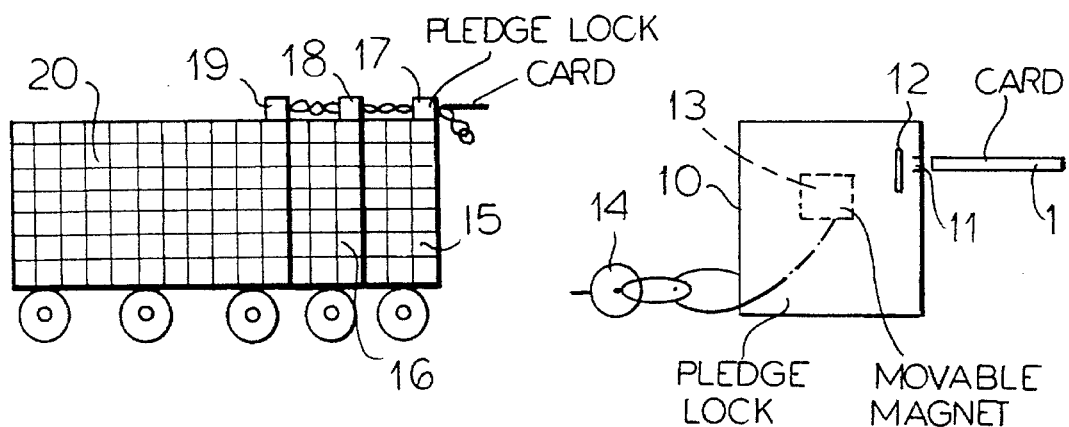
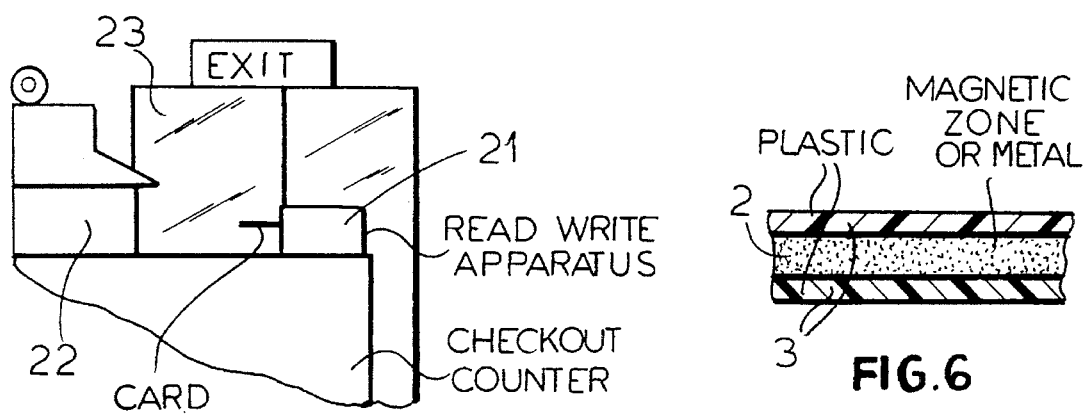
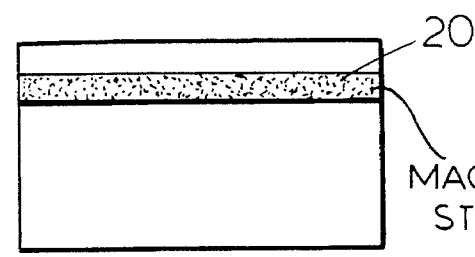
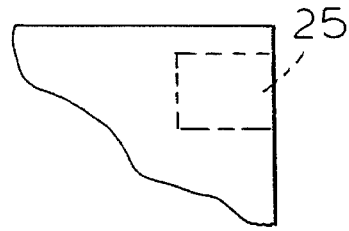

CARD FOR A PLEDGE LOCK

FIELD OF THE INVENTION

The invention relates to a card for a pledge lock for shopping trolleys or luggage trolleys to be releasably attached to one another.

BACKGROUND OF THE INVENTION

A card for a pledge lock is disclosed in German patent document DE 42 29 332. An important aspect thereof is that the lock does not accept just any card, but the coupling member can be unlocked only by certain cards.

OBJECT OF THE INVENTION

It is an object of the invention to providing an improved pledge lock of the kind specified that the coupling member can be unlocked due to the particular design of the simply constructed card.

SUMMARY OF THE INVENTION

This object is achieved by making the card so that the lock can be magnetically actuated by the card.

The lock can thus be actuated only by a card constructed in this manner, by the magnetic attraction of a particular small or large area of the card. On the one hand, the magnetic or magnet-attracting zone of the coupling member can be unlocked directly or via an intermediate member, but on the other hand it can also be done by the insertion of only a correctly constructed card into the lock, such insertability first making unlocking possible. At the same time the lock and card are very simply constructed and have small outside dimensions. Moreover, other results are high functional efficiency and security and simple handling.

A lock can have a magnet movably mounted therein and triggered for unlocking by a metal card or a card having a metal zone. To actuate a member movably mounted in the lock and triggering unlocking, the card can be magnetic or can have a magnetic zone, particularly one which is coated with magnetizable material. Advantageously, the metal or magnetic zone is disposed between two plastic surfaces.

The card can also have a magnetic strip by which items of information can be stored and/or called up via a read/write apparatus which is preferably disposed at the checkout or at the entry/exit of a shop. The card can have an electronic chip and/or an integrated circuit.

BRIEF DESCRIPTION OF THE DRAWING

The above and other objects, features, and advantages will become more readily apparent from the following description, reference being made to the accompanying drawing in which:

FIG. 4 is a diagrammatic side view showing shopping trolleys with the pledge locks;

FIG. 5 is a diagrammatic elevational view of the lock showing a magnet movably mounted therein;

FIG. 6 is a cross sectional view of the card of FIG. 2 showing the two plastic surfaces;

FIG. 7 is an elevational view at the checkout or entry/exit of a shop illustrating the read/write apparatus;

FIG. 8 is a plan view of a card showing the magnetic strip; and

FIG. 9 is a fragmentary view of a card showing an electronic chip or integrated circuit carried by the card.

Figure 1:
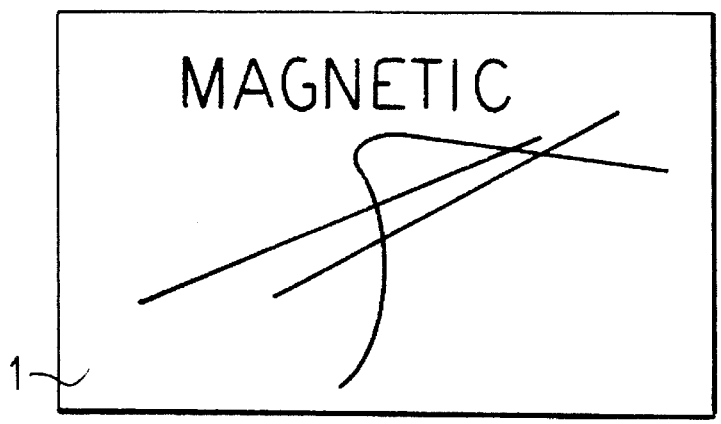
FIG. 1 is an elevational view of a card, all or a certain zone of which is magnetic.

A pledge lock (not shown in FIG. 1) has a casing 10 (FIG. 5); whose side wall is formed with a slot 11 into which a card 1 can be inserted as a pledge. In addition to the slot 11 for the card, a further slot 12 can be provided via which a coin can alternatively be inserted as a pledge.

The insertion of a suitable card moves a control member 13 which unlocks a closure bolt, which releases a coupling member 14 of an adjacent shopping trolley. As soon, therefore, as the card has been inserted into the lock of the first trolley 15 (FIG. 4), the coupling member 14 of the adjacent trolley 16 is released, and the trolley can be removed. The precise construction and function of the lock is disclosed in German Patent document 43 18 627. The lock 17, 18, 19 is attached either to the handle of a shopping trolley 15, 16, 20 to a handle strut or to the trolley basket.

The various embodiments of the card disclosed hereinafter optionally perform two different functions.

1. In a first embodiment the card is so shaped that it can be inserted or inserted deeply enough into the slot only if the card is correctly constructed, the lock of the coupling member being released by insertion or sufficiently deep insertion into the lock.

2. In a second application, the special construction of the card is not intended to impede its insertion. On the contrary, even a wrong card can be completely inserted. However, the wrong card does not release the locking—i.e., the lock is released, and therefore the coupling member can be unlocked, only by the card having the correct design with the special correct card construction, for example, with a projection disposed at the correct place on the card.

All the card constructions or designs disclosed hereinafter can always perform either the one function or the other. Moreover, care must be taken that a card inserted into the lock is firmly retained therein after the unlocking of the coupling member. Additional constructions, for example, operations in the card, can be provided for this purpose. In many cases even the special type of construction of the card is enough to ensure that the card is firmly retained in the lock, until a coupling member of a second trolley is again inserted in the lock.

The various card constructions will be disclosed individually hereinafter; two or more kinds of construction can also be provided on a single card:

FIG. 1 shows a card, all or a particular zone of which is magnetic. The card is therefore either magnetic over its entire area, for example, because it consists of a magnetic metal plate, or the card 1 has only a magnetic zone in the form of a metal strip or a magnetic coating. Disposed in the pledge lock is a metal member 13 which is attracted by the card shown in FIG. 1 and as a result unlocks the coupling member, either directly or via intermediate members, or else opens up the introduction shaft for the complete insertion of the card, so that the completely inserted card mechanically produces unlocking.

Figure 2:
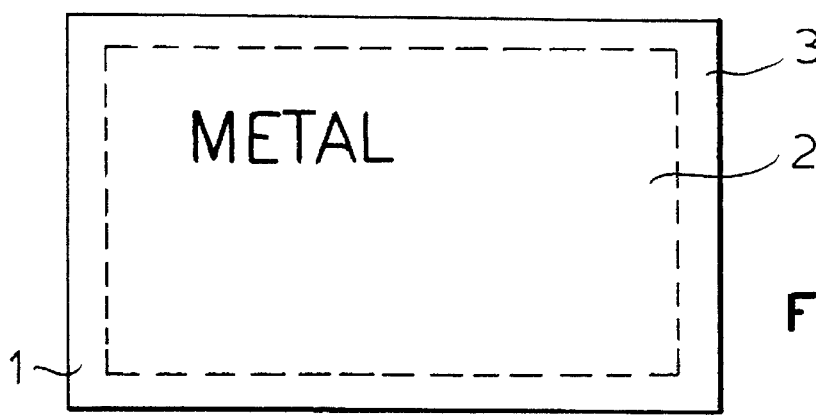
FIG. 2 is a similar view which shows a card in which a metal foil is disposed between two plastic foils or paper/paperboard.
Figure 3:
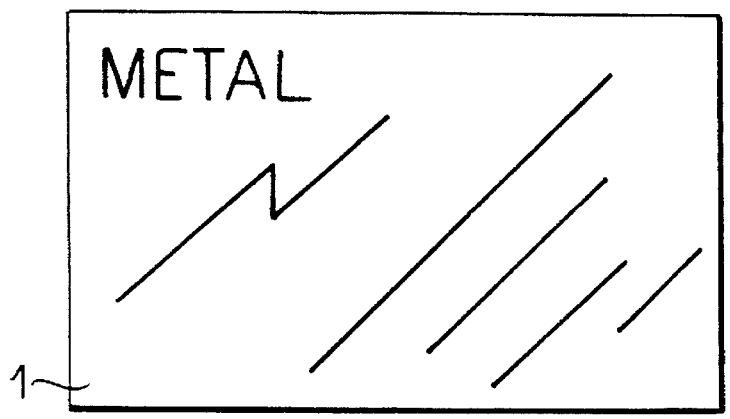
FIG. 3 is another elevational view which shows a metal card.

The embodiments illustrated in FIGS. 2 and 3 differ from that shown in FIG. 1 by the feature that the card itself is nonmagnetic, but has a magnetic, more particularly metal zone by which a magnet (also represented at 13) can be actuated inside the lock casing, either to produce unlocking or else to check the correctness of the card and open up the introduction channel of the lock only if it is the correct card. The embodiment illustrated in FIG. 2 shows a metal foil 2 which is welded or glued between two plastic foil 3 and/or paper/paperboard sheets (see also FIG. 6). The metal surface can be relatively small in comparison with the overall size of the card.

In a further alternative, however, the metal zone can also be formed by a coating of magnetizable material. Either the coating itself is magnetic or else it attracts a magnet by the metal. The card shown in FIG. 3 consists entirely of a metal foil or plate and can be coated with transparent plastics. In all the embodiments the layers, more particularly the metal surfaces, can be colored and carry printed inscriptions.

The card also comprises a magnetic strip 20 (FIG. 8) by which items of information can be stored via a read/write apparatus 21 and/or called up, such apparatus being preferably disposed at the checkout 22 or the entry/exit 23 of a shop (FIG. 7). The magnetic strip gives the card additional functions. More particularly, items of information concerning the customer, the trolley and/or the goods can be obtained thereby.

The card can have an electronic chip and/or an integrated circuit 25 (FIG. 9).

I claim:

1. A pledge lock system for trolleys of a shop, comprising:

a plurality of trolleys each provided with a respective pledge lock having a connecting member engaged in a pledge lock of another trolley, said pledge locks having movable members movably mounted in the respective locks actuatable to release the connecting members;

a card for magnetically actuating said pledge locks and comprising at least one of a metallic zone and a magnetic zone disposed between two plastic surfaces, a movable member of one of said pledge locks being magnetically actuated upon insertion of said card into said one of said pledge locks;

a magnetic strip on said card carrying information and on which information can be stored; and a read/write apparatus at a checkout, entry or exit of said shop cooperating with said magnetic strip for storing information thereon and deriving information stored on said magnetic strip.

2. The card defined in claim 1 having an electronic chip or integrated circuit.

\* \* \* \* \*